Figure 1:
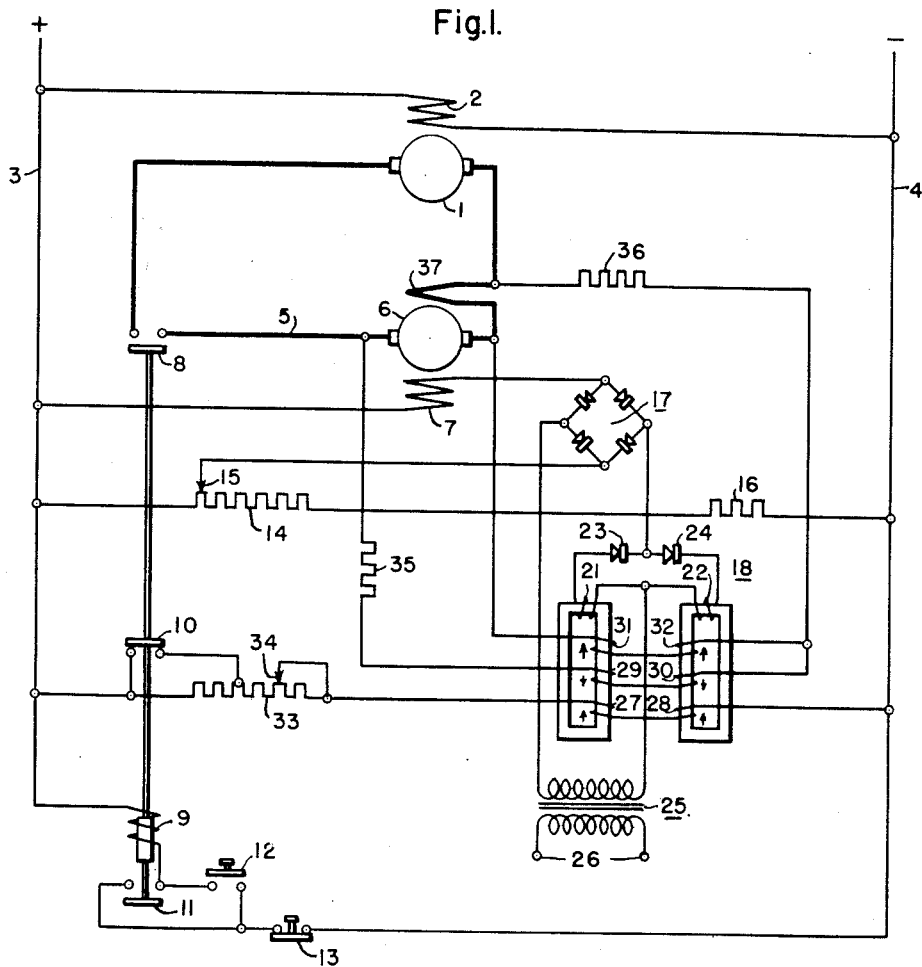

Dec. 22, 1953   M. H. FISHER   2,663,833
MAGNETIC AMPLIFIER CREEPING SPEED CONTROL
Filed April 15, 1950

WITNESSES:

INVENTOR
Martin H. Fisher.
BY
ATTORNEY

Patented Dec. 22, 1953

2,663,833

UNITED STATES PATENT OFFICE 2,663,833

MAGNETIC AMPLIFIER CREEPING SPEED CONTROL

Martin H. Fisher, Pittsburgh, Pa., assignor to Westinghouse Electric Corporation, East Pittsburgh, Pa., a corporation of Pennsylvania Application April 15, 1950, Serial No. 156,068

10 Claims. (Cl. 318—143)

My invention relates to electric drives and more particularly to apparatus for controlling or regulating the driving speed when the drive, normally operating at relatively high speed, is set for operation at creeping speed as needed for threading, adjusting, positioning, levelling or the like operations.

There are fabricating or processing installations, for instance, where it is necessary to thread material through the machinery at a speed much below the speed range of the processing operation proper. In order to minimize defects or scrap, it is necessary that the processing of the material be started at the low threading speed and continue during the accelerating period to the high operating speed. In the case of certain machines, such as supercalenders in the paper industry which often are threaded at 50 feet per minute and normally operate at 2000 F. P. M., load is applied to the motor at creeping speed by imposing pressure on the rolls, and, unless a speed regulator is used, the motor will stall as the load is applied.

It is an object of my invention to provide a speed regulator for machines of the above-mentioned kind that will smoothly and automatically come into operation when the drive speed is lowered to threading or creeping speed and that will permit a smooth acceleration of the machinery from the regulated low speed to the high speed of normal operation.

Another object of my invention is to provide a low-speed regulator that secures a sufficient breakaway torque even when the driven machinery, started from standstill, is set to run at creeping speed.

Still another object of my invention is to provide a low-speed regulator of a rugged design which does not rely on contactors or other movable auxiliaries for performing its regulating operation and which does not require such contactors or movable auxiliaries for being protected or made ineffective when the drive operates beyond the control range of the regulator.

In prior creeping-speed regulators, the field winding of the generator of a variable-voltage drive is connected in a resistance bridge circuit consuming as much power in the resistance legs of the bridge as in the generator field winding. It is, therefore, also an object of my invention to minimize power losses and permit using smaller control rheostats and a reduced exciter capacity as compared with the known creeping-speed regulators.

Figure 2:
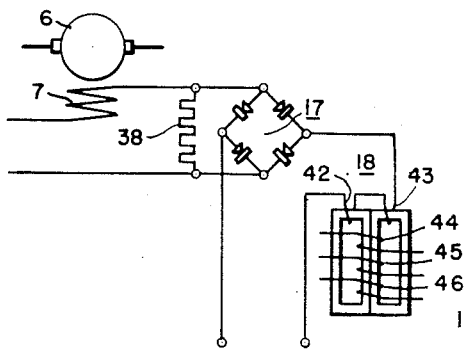

These and other objects of my invention will be apparent from the following description in conjunction with the drawing, in which:

Figure 1 shows the circuit diagram of an example of speed-control apparatus according to the invention; and Fig. 2 shows part of the same apparatus in a somewhat modified design.

In Fig. 1 the armature of the drive motor to be controlled is denoted by 1, and the appertaining field winding by 2. The field winding 2 receives constant excitation from direct-current buses 3 and 4, energized from a suitable source with the polarities indicated. The motor armature is connected in a loop circuit 5 including the armature 6 of a generator whose main field winding is denoted by 7. The loop circuit includes the contacts 8 of a contactor C whose control coil 9 also actuates an auxiliary contact 10 and a holding contact 11. The coil 9 is energized from the buses 3 and 4 through a starting push button switch 12 and a stop push button switch 13. Actuation of switch 12 causes the contactor C to close the loop circuit. Thereafter, the holding contact 11 maintains the coil 9 energized and the contactor C actuated until the stop switch 13 is depressed.

Normal excitation for the generator field winding 7 is supplied from buses 3 and 4 through a speed-control rheostat 14. The selected position of the rheostat slider 15 determines the field excitation voltage and, hence, the output voltage of the generator and the speed of the motor. A resistor 16 is preferably connected in series with the rheostat 14 between the buses in order to limit the maximum field excitation. For instance, if the voltage across buses 3 and 4 is 230 volts, the resistance of resistor 16 may be rated to provide a maximum voltage drop of 180 volts across the speed-control rheostat.

Series connected in the circuit of field winding 7 is a full-wave rectifier 17. Its output voltage, impressed on the field circuit, is poled in series-cumulative relation to the voltage taken from across the active portion of the speed-control rheostat 14. The output voltage of rectifier 17 and the appertaining rectifier control devices described in the following is rated so that the maximum rectified voltage is much smaller, for instance, a small fraction of the maximum voltage derivable from the speed-control rheostat in the generator field circuit. A rectified maximum output voltage of 20 volts, for instance, is sufficient for performing the desired low-speed regulating performance.

The alternating-current input voltage to the rectifier 17 is controlled by a saturable reactor device, or magnetic amplifier, denoted as a whole by 18. A large variety of controllable reactor devices and magnetic amplifier circuits suitable for the purposes of the invention are well known as such. In the design chosen for illustration, the magnetic amplifier is equipped with two saturable reactors whose alternating-current or main windings 21 and 22 are parallel connected to each other in the energizing circuit of the rectifier 17. Two electric valves 23 and 24 of mutually opposed poling are connected in the respective parallel circuits of the reactor main windings so that during one half wave of the alternating energizing current, this current passes through only one main winding, while during the next half wave the current passes through the other main winding. As a result, the controlled alternating current has the effect of imposing on the individual main windings and the respective saturable magnet cores of the device a unidirectional excitation, thus causing the two reactors to saturate when sufficient current passes through the device.

Each of the two reactors of the device is equipped with three direct-current saturation control coils denoted by 27, 29 and 31, and 28, 30, and 32. When the resultant direct-current excitation of the control coils of each reactor is low, the reactor core remains unsaturated and the effective impedance of the appertaining main winding is high so that only a negligible current can flow in the rectifier input circuit. When the resultant direct-current excitation of the control windings is high, the reactor core has a high degree of saturation so that the effective reactance of the main winding is low, and the current supplied to the rectifier input terminals is high. In this manner the rectified output voltage impressed by the rectifier 17 on the field circuit of the generator is varied between a minimum and the available maximum of, for instance, 20 volts with the effect of controlling and regulating the motor speed in the manner more fully explained below.

The reactor control coils 27 and 28 are energized from the constant-voltage buses 3 and 4 through a control resistor or rheostat 33. The selected position of the resistor tap point 34 determines the voltage impressed across the control windings 27 and 28, and this voltage (pattern voltage) serves as a standard or reference which determines the speed at which the motor is to run when the above-mentioned speed-control rheostat 14 has its slider 15 set at zero or minimum voltage.

The control coils 29 and 30 of the reactors are connected through resistors 35 and 36 across the generator armature circuit so that these coils are excited in dependence upon the voltage applied to the motor. The excitation of the voltage measuring coils 29 and 30 is in opposition to the pattern excitation of coils 27 and 28.

The control coils 31 and 32 of the reactors are connected, through resistor 36, across the commutating field winding 37 of generator 6 or may be connected across any other resistor connected in series with the loop circuit so that its voltage drop is a measure of the load current flowing through the motor armature.

When the armature circuit is interrupted at contacts 8 and the motor 1 is at standstill, part of the control resistor 33 is shorted by the contacts 10. Consequently, before the motor is started, the pattern coils 27 and 28 receive higher excitation than during the regulating performance, thus calling for a higher speed and torque than when the motor is running at creeping speed. When the slider 15 of the speed-control rheostat is set for zero or minimum voltage, as shown in the illustration, the closing of switch 12 has the effect of placing the minimum resistance of resistor 33 into the circuit of the pattern coils 27 and 28 at the moment the motor is started. Then, the motor is subjected to a sufficient breakaway torque before the voltage drop across coils 27 and 28 has decayed to the adjusted lower value. With the just-mentioned setting of the speed-control rheostat, the excitation for the generator field winding 7 is supplied only from the rectifier 17. Consequently, due to the small output voltage of this rectifier, the motor voltage and speed is as low as is required for the desired creeping or threading speed. At this low speed, the resultant degree of saturation in the reactors of the amplifying device 18 is predominantly determined by the resultant effect of the excitation supplied by the pattern coils 27, 28 and the opposingly acting voltage responsive control coils 29 and 30. The excitation of the current-responsive coils 31 and 32 is cumulative to that of the pattern coils 27 and 28 and corrects the resultant reactor saturation in accordance with the IR drop in the armature circuit. The resultant control effect of coils 29, 30 and 31, 32 is substantially proportional to the counter E. M. F. of the motor and, hence, to the motor speed. The reactor device thus operates to regulate the motor speed for maintaining it at a constant value determined by the selected position of the tap point 34 of resistor 33.

When after the completion of a threading operation the speed of the drive is to be increased to the normal high operating speed, the slider 15 of the speed-control rheostat 14 is moved in the excitation increasing direction, i. e. toward the right as shown in Fig. 1. The voltage then impressed on the generator field winding 7 is then increasingly determined by the voltage drop taken from across the active portion of rheostat 14. When this voltage reaches values much higher than the maximum voltage obtainable from the rectifier 17, the regulating effect of the rectifier and magnetic amplifier becomes less influential, and at the normal high voltage for the regular operation of the drive, the regulation is negligible. Consequently, there is a smooth and continuous transition from the related threading or creeping speed to the normal operating speed. It will be recognized that this effect is achieved without the operation of electromagnetic relays, contactors or other movable apparatus, nor is there a necessity of short-circuiting the creeping speed regulator during normal operation. It is merely necessary for best results to give the rectifier 17 a current rating (for instance, 4 amps.) equal to the generator full field value, but its voltage rating need only be approximately equal to the secondary voltage (for instance, 20 volts) of the power supply transformer. Relatively small rectifiers are capable of satisfying these requirements.

As also apparent from the illustrated example, regulating apparatus according to the invention are extremely simple and can be given a minimum of circuit components. It will also be recognized that the saturable reactor device or magnetic amplifier does not necessarily require a high amplifying gain. The size of the reactor devices is relatively small because the regulator supplies only the small amount of power necessary for controlling the low creeping speed voltage. The resistance losses in the generator field circuit are low so that the speed-control rheostat as well as the other auxiliary resistors can be given a low rating and small size as compared with the equipment needed in apparatus heretofore known for comparable purposes.

It should be understood that the above-described breakaway torque features are not always required depending upon the particular application. For some purposes, the resistor 35 may be of the non-linear type having an increasing resistance as the generator voltage rises. If desired, means may be added for controlling or regulating the normal operating speed, such means being known as such, not essential to the invention proper and hence not illustrated.

Figure 2 shows a modified portion of control apparatus otherwise assumed to be designed and operative in accordance with the above-described embodiment of Figure 1. In the apparatus shown in Figure 2, a resistor 38 is connected across the output terminals of the rectifier 17, thus reducing the current-carrying duty imposed on the rectifier 17 during normal speed operation of the drive. Also according to Figure 2, the saturable reactance device 18 has two main windings 42 and 43 series connected with each other in the alternating-current input circuit of the rectifier 17. The core of the device is equipped with three control coils 44, 45, and 46 which correspond to the respective coils 27, 29, and 31 of the embodiment shown in Figure 1 and are connected in a pattern circuit, voltage circuit, and current circuit in the manner apparent from Figure 1. This modification will exemplify that the invention is not predicated upon the provision of specific design features and that such apparatus can be altered and modified in various respects and can be given designs other than those specifically mentioned without departing from the objects and essence of the invention.

I claim as my invention:

1. Speed-control apparatus, comprising a variable-voltage drive of the Ward-Leonard type having a speed-controlling generator field winding, rectifier means having output terminals and input terminals, direct current voltage supply terminals, circuit means, having a voltage-adjustable member series connected with said rectifier output terminals and said field winding, connected across said voltage supply terminals in voltage-cumulative relation to said rectifier, alternating-current supply terminals for the input terminals of the rectifier, a saturable reactor device series connected to said rectifier input terminals to provide at said rectifier output terminals a variable rectified voltage dependent upon the impedance of the reactor, said reactor device having control coil means for controlling the impedance of said reactor device, and drive-speed responsive voltage supply means connected with said drive and said coil means to control the impedance of said reactor device substantially in accordance with the speed of said drive.

2. Speed-control apparatus, comprising a variable-voltage drive of the Ward-Leonard type having a speed-controlling generator field winding, rectifier means having output terminals and input terminals, direct current voltage supply terminals, circuit means, having a voltage-adjustable member series connected with said rectifier output terminals and said field winding, connected across said voltage supply terminals in voltage-cumulative relation to said rectifier, said member having a voltage range extending up to a maximum voltage rated for operating said drive at a desired high speed, alternating-current supply terminals for the input terminals of the rectifier, a saturable reactor device series connected to said input terminals of said rectifier to provide at said rectifier output terminals a voltage variable up to a maximum smaller than said first-mentioned maximum, said reactor device having control coil means for controlling impedance of said reactor device to vary said rectified voltage, and drive-speed responsive voltage supply means connected with said drive and said coil means to control the impedance of said reactor device substantially in accordance with the speed of said drive, whereby the speed of said drive is regulated by said reactor device to be substantially constant when said member is adjusted for a desired low speed.

3. Speed-control apparatus, comprising a variable-voltage drive of the Ward-Leonard type having a speed-controlling generator field winding, a rectifier rated to have a given maximum value of output voltage when supplied with rated input voltage, adjustable direct current voltage supply terminals, rheostatic voltage adjusting means for said field winding having an adjusting range between a given minimum voltage that is smaller than said given maximum value and a maximum voltage that is higher than said given maximum value to operate said drive over a range varying from a relatively slow speed to a relatively high speed, said voltage adjusting means and said rectifier being series connected to each other and in polarity sense so connected to said voltage supply terminals that their effect is cumulative on said generator field winding, alternating-current supply terminal means, a saturable reactor device connected in series relation with said rectifier and connected to the alternating current supply terminals to provide controllable input voltage therefor, said reactor device having control winding means for controlling said input voltage, and circuit means connecting said winding means with said drive for exciting said winding means substantially in accordance with the speed of said drive, whereby said speed is regulated to be substantially constant when said rheostatic voltage adjusting means is set for said slow speed.

4. In combination, a variable-voltage drive having a motor and a generator with a common armature circuit and having a field winding on said generator for controlling the motor speed, direct-current supply means of substantially constant voltage having a speed-control rheostat connected with said winding to provide it with selectively adjustable voltage, a rectifier having direct-current terminals series-cumulatively connected between said rheostat and said winding and having a given maximum output voltage, said rheostat being adjustable between two voltage limits higher and lower, respectively, than said maximum output voltage, a magnetic amplifier having an alternating-current supply circuit and being connected to said rectifier, said amplifier having control means comprising a pattern coil circuit circuit-connected to said direct-current supply means to provide an amplifier reference excitation, and said control means comprising condition-responsive circuit means connected with said armature circuit to provide a substantially speed-proportional amplifier control excitation differentially related to said reference excitation, whereby said drive is controlled by said amplifier and rectifier to operate at regulated speed when said rheostat is adjusted for low drive speed.

5. In a combination according to claim 4, said condition-responsive circuit means comprising two coil circuits, one of said coil circuits being connected across said armature circuit to be excited in accordance with the terminal voltage of said motor, a resistance member series connected in said armature circuit, and said other coil circuit being connected across said resistance member and being rated relative to said one coil circuit to provide a corrective excitation smaller than that of said one coil circuit and opposed thereto.

6. In a combination according to claim 4, said pattern coil circuit having a resistor for controlling said reference excitation, a contactor having a main contact series connected in said armature circuit for opening and closing said armature circuit and having an auxiliary contact connected across said resistor for increasing said reference excitation when said main contact is open to provide breakaway torque of said motor when said main contact closes.

7. Speed-control apparatus, comprising a variable-voltage drive having a speed-controlling winding, rectifier means having output terminals and input terminals, direct voltage supply means having a voltage-adjustable member series connected with said rectifier output terminals across said winding in voltage-cumulative relation to said rectifier, alternating-current supply means and a saturable reactor device series connected to said input terminals to provide at said output terminals a variable rectified voltage, said reactor device having a direct-current pattern coil and having direct-current coil means connected with said drive to provide speed-measuring reactor excitation, a circuit of normally constant voltage having a resistor series connected with said pattern coil to provide said pattern coil with speed reference excitation, said pattern coil being poled to have said excitations oppose each other, a contactor having main contact means connected with said drive for shorting when actuated said drive, said contactor having an auxiliary contact shorting said resistor and open only when said drive is started by actuation of said main contact means.

8. In a system of control for a Ward-Leonard drive including a motor, having an excited field winding, and a generator, having a field winding the excitation of which is to be controlled, and the motor and generator armatures being connected in a loop circuit, in combination, a pair of direct current supply terminals energized at a selected voltage value, a resistor connected across said direct current supply terminal, a rectifier having a pair of input terminals and a pair of output terminals, said generator field winding having one connection connected to one of the supply terminals and its other connection connected to one of the output terminals of the rectifier, a lead having one end connected to the other output terminal of the rectifier and its other end connectable at any point along said resistor to thus provide for a voltage variation of the generator field winding, from the resistor, from a zero voltage value to a selected maximum voltage value, a magnetic amplifier having output windings connected to the input terminals of the rectifier, alternating current supply terminals connected to energize the magnetic amplifier, and direct current control windings, responsive to an operating characteristic of said drive, for controlling the input to said rectifier.

9. In a system of control for a Ward-Leonard drive including a motor, having an excited field winding, and a generator, having a field winding the excitation of which is to be controlled, and the motor and generator armatures being connected in a loop circuit, in combination, a pair of direct current supply terminals energized at a selected voltage value, a resistor connected across said direct current supply terminal, a rectifier having a pair of input terminals and a pair of output terminals, said generator field winding having one connection connected to one of the supply terminals and its other connection connected to one of the output terminals of the rectifier, a lead having one end connected to the other output terminal of the rectifier and its other end connectable at any point along said resistor to thus provide for a voltage variation of the generator field winding, from the resistor, from a zero voltage value to a selected maximum voltage value, a magnetic amplifier having output windings connected to the input terminals of the rectifier, said rectifier output terminals being connected to the field winding to act cumulatively to the voltage supplied to the generator field winding from the position of the lead on the resistor, alternating current supply terminals connected to energize said magnetic amplifier, and direct current control windings, responsive to the speed of said drive, for controlling the input to said rectifier.

10. In a system of control for a Ward-Leonard drive including a motor, having an excited field winding, and a generator, having a field winding the excitation of which is to be controlled, and the motor and generator armatures being connected in a loop circuit, in combination, a pair of direct current supply terminals energized at a selected voltage value, a resistor connected across said direct current supply terminal, a rectifier having a pair of input terminals and a pair of output terminals, said generator field winding having one connection connected to one of the supply terminals and its other connection connected to one of the output terminals of the rectifier, a lead having one end connected to the other output terminal of the rectifier and its other end connectable at any point along said resistor to thus provide for a voltage variation of the generator field winding, from the resistor, from a zero voltage value to a selected maximum voltage value, a magnetic amplifier having output windings connected to the input terminals of the rectifier, said rectifier output terminals being connected to the field winding to act cumulatively to the voltage supplied to the generator field winding from the position of the lead on the resistor, the rectifier being designed to receive a voltage at its output terminals varying from zero to substantially the full voltage of the direct current supply terminals, and having a rating to provide an output voltage at its output terminals, depending on the output of said magnetic amplifier, that varies from a relatively low value to its maximum value that is a relatively small fraction of the voltage of said direct current supply terminals.

MARTIN H. FISHER.

References Cited in the file of this patent

UNITED STATES PATENTS

| Number | Name | Date |
|---|---|---|
| 2,137,068 | Valentine et al. | Nov. 15, 1938 |
| 2,140,349 | Dawson | Dec. 13, 1938 |
| 2,285,654 | Hanna et al. | June 9, 1942 |
| 2,286,370 | Miller | June 16, 1942 |
| 2,502,098 | Lindfors | Mar. 28, 1950 |

FOREIGN PATENTS

| Number | Country | Date |
|---|---|---|
| 446,790 | Great Britain | May 6, 1936 |